May 1, 1951        E. W. WILSON        2,551,077
COLLET
Filed June 29, 1946
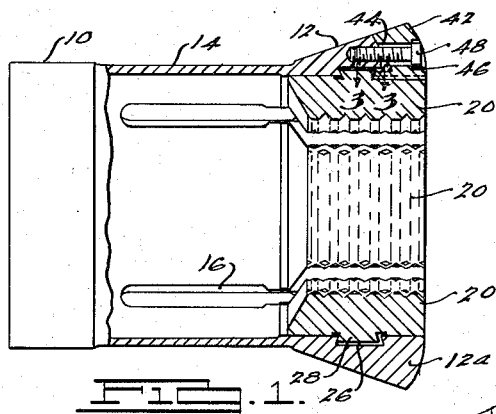
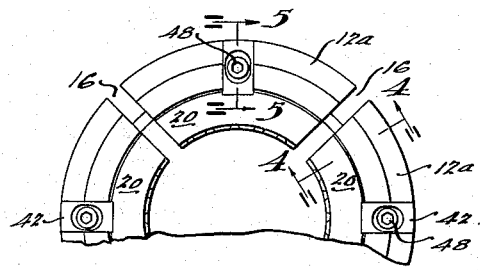
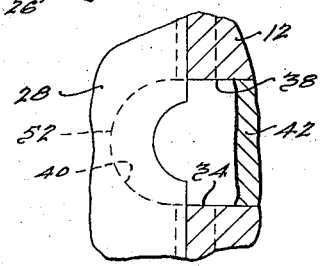
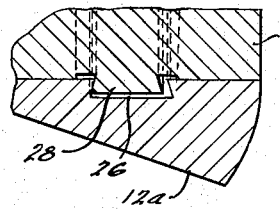
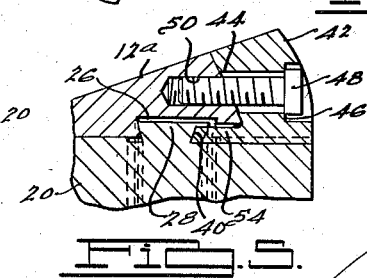
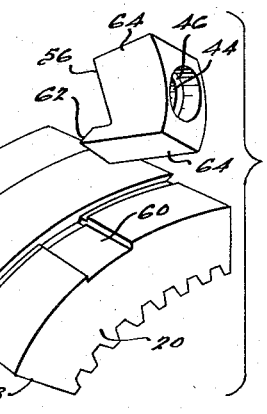
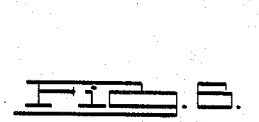
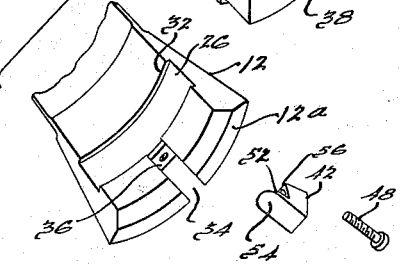
INVENTOR.
*Edgar W. Wilson.*
BY
*Harness, Dickey & Pierce.*
ATTORNEYS.

Patented May 1, 1951

2,551,077

UNITED STATES PATENT OFFICE 2,551,077

COLLET

Edgar W. Wilson, Sturgis, Mich., assignor to Sutton Tool Company, Sturgis, Mich., a corporation of Michigan Application June 29, 1946, Serial No. 680,449

4 Claims. (Cl. 279—46)

This invention relates to collets of the type employed in a screw machine or the like for chucking bar stock for machining, and particularly to those types of collets commonly termed master collets provided with removable gripping pads.

The primary object of the present invention is to provide a master collet of novel and improved construction having novel and improved means for removably securing pads to the master collet.

Another object of the present invention includes the provision of means for removably securing the gripping pads to a master collet comprising a circumferential groove in the opening of said master collet arranged for co-operative reception of a shoulder formed on each pad.

The present invention also contemplates means co-operating between the axially outer ends of the pads and the outer end of the master collet for securing such pads against axial movement.

Another object of the present invention is the provision of a construction in which the circumferential groove in said collet and the circumferential shoulder on each pad are beveled so that the pads in being pressed axially inwardly of the collet have their ends pressed radially outward against the co-operating surface of the master collet.

Still further the invention contemplates means for securing the axially outer ends of the pads to the master collet which act to move the pads axially inwardly of the master collet and simultaneously draw its outer ends radially outwardly into firm engagement with the wall of the master collet.

A still further object of the present invention consists in the provision of means for securing the axially outward ends of the pads to the outer end of the master collet which means also serve to lock such pads against relative rotation with respect to the collet.

Many other and further objects, advantages, and features of the present invention will become apparent from the following description, when considered in conjunction with the accompanying drawings wherein:

Figure 1 is a partially broken, partially sectioned side elevational view of a master collet and illustrating the pads therefor in position therein;

Figure 2 is a partially broken end view of the construction shown in Figure 1, taken from the right-hand end thereof as viewed in Figure 1;

Figure 3 is a section taken on line 3—3 of Figure 1 and illustrating a tongue of one of the holding means seated on the bottom land provided in a pad groove;

Figure 4 is a section taken on line 4—4 of Figure 2 and greatly enlarged to show a dovetail rib on one pad in engaging relation with the dovetail groove in the inner radial face of a finger of the collet;

Figure 5 is a section taken on line 5—5 of Figure 2 and greatly enlarged to show a holding element in position for holding a pad in the collet;

Figure 6 is an exploded view of one of the radial fingers with a pad to register therein and the holding means to secure said pad to said radial finger;

Figure 7 is a modified form of the invention in which the grooves provided in the sides of the pads have a beveled bottom, the surface of which is not a portion of a frusto-conical surface, and illustrating a holding means adapted to bottom therein.

Except for the features of the present invention, the type of collet to which the present invention is applicable may be conventional. In the specific embodiment of the invention illustrated in the drawings, and particularly shown in Figure 1, it may comprise a shell-like body of circular section having a cylindrical portion 10 at one end thereof, a frusto-conical portion 12 at the opposite end thereof, and a cylindrical portion 14 intermediate the ends of a slightly smaller diameter than the end 10. In practice, the end 10 may be provided with internal threads, or provided with external threads, depending upon the type of mechanism employed for operating it. The frusto-conical end 12 may be tapered inwardly when employed for a "pull in" type of collet or outwardly for a "push out" type of collet. In the case shown by way of illustration, the collet is of the so-called "pull in" type, and the end 10 is shown as being internally threaded. Also in accordance with conventional practice the portion 14 is provided with a plurality of elongated openings or slots 16, and in the case shown there are four, therethrough equally angularly spaced with respect to each other about the axis of the collet. The slots 16 extend out through the outer or right-hand end of the collet as viewed in Figure 1 so as to divide the major portion of the collet into four flexible finger portions, each designated by the numeral 12a, rigidly connected together at their rear ends by the unslotted portion 10, whereby a co-operating part having a frusto-conical surface complementary to the frusto-conical end 12 may act through the frusto-conical portion 12 to radially contract the free end portions of the fingers 12a upon relative axial movement between the collet and such member, thereby to grip a piece of work in the collet, all as is well understood in the art.

The frusto-conical end 12 of the collet has an internal cylindrical bore and the radially inner face of each finger 12a, as is well known to those skilled in the art, receives the radially outer surface of a pad 20. Inasmuch as the pads 20 are formed with a radially outer surface which is a segment of a cylindrical surface having the same diameter of the internal bore of end 12, it will be observed that the pads 20 will accurately and precisely mate the fingers 12a. The gripping pads 20 may be collectively formed to present either a circular or non-circular opening for reception of the work, usually circular where the work is a cylindrical rod or shaft, or hexagonal if the work is of hexagonal cross-sectional conformation, as will be well understood by those familiar with the use of such collets. In the case at hand, the pads 20 shown by way of illustration, are intended to receive a cylindrical shaft or rod and accordingly their radially inner faces are formed as segments of a cylindrical surface and additionally formed to provide gripping facets 22, which in the case shown are of diamond-shaped conformation as disclosed and claimed by United States Patent No. 1,955,642, issued April 17, 1934, on Collets.

The securement of the gripping pads such as 20 in a master collet of the type shown has always presented a problem, and various means which have been successful to a greater or lesser degree have been suggested for solving such problem. The present invention provides a solution to such problem which is both simple and effective, but which is also novel and improved. In accordance with the present invention a circumferential dovetail groove 26 is formed in the radially inner surfaces of the fingers 12a.

Each of the pads 20 is provided on the outer radial face thereof with a circumferentially extending, outwardly directed projection in the form of a dovetail rib 28 which is adapted to register within the dovetail groove 26 in each finger. An inner surface 30 of the rib 28 on each pad and an axially inclined surface 32 in the groove 26 enter into engagement with each other to lock the pads radially into the collet as well as to lock the pads 20 against axially rearward movement relative to the fingers 12a. In order to accommodate for easy removal of the pads, radially of such collet, the width of the groove 26 at the smallest point is slightly greater than the width of the rib at the widest point, allowing sufficient clearance to compensate for the inclined surfaces of such groove and rib. The above described engagement between the surfaces 30 and 32 will urge the axially outer faces of the pads 20 radially outwardly of the collet and into firm engagement with respect to the cylindrical walls of the end portion 12 when pressure is applied to the pads for urging them axially inwardly of the master collet as will hereinafter become more clear.

To urge the pads 20 axially inwardly of the master collet and to hold them against axially outward movement therein a novel and improved holding element is provided. It will be observed that each of the fingers 12a is slotted at a position substantially central with respect to the circumference thereof as indicated at 34, and as may be seen best in Figure 4. Each of the slots 34 extend axially of the fingers 12a and there is formed in each a beveled bottom land 36 which slopes downwardly from the inner diameter of said fingers to the outer diameter of the same. To mate with the slots 34 in each of the fingers 12a, there is provided in the pads 20 a groove 38 in the radially outer surface of each, which extends axially inwardly from the outer end of the pad to form an inner land 40, which is a portion of a frusto-conical surface, in the outer side of the rib 28. When the pads 20 are installed in the master collet, with each groove 38 in alignment with the slot 34 in the corresponding finger 12a, each co-operating slot and groove is adapted to receive a holding element 42.

Each of the holding elements comprises a member of a width to be closely but slidably received in a pair of corresponding and co-operating grooves or slots 34 and 38. An opening 44 extends axially through each of the holding elements and is counterbored at its outer end to provide a shoulder 46. A bolt 48 passes through the opening 44 and is threaded into a tapped opening 50, provided in the co-operating finger, and it will be observed that as bolt 48 is tightened, the holding element will be drawn axially inwardly into a co-operating slot 38 and groove 34. When the head of the bolt 48 is tight against shoulder 46, the frusto-conical surface 52, on the axially inner end of the tongue 54 of the holding element, will mate with the bottom land 40 in the slot 38, which was described in the foregoing as being a frusto-conical surface, and at the same time the beveled surface 56 of the holding element will bottom on the beveled surface 36 in the groove 34. This axial movement of the holding elements inwardly of the collet also causes the inner surface 30 on the rib 28 of each pad and the axially inclined surface 32 in the groove 26 to enter mating engagement, serving to urge the axially outer end of each of the pads 20 radially outwardly of the collet and into firm engagement with the cylindrical walls of the co-operating finger 12a, due to the action of the inclined surfaces.

Up to this point, nothing has been said about preventing relative rotative movement of the pads 20 with respect to the master collet. It has been stated previously, however, that each of the holding elements is adapted to be closely but slidably received in a corresponding pair of cooperating grooves or slots 34 and 38. Inasmuch as the slots 34 are formed in the fingers 12a, it will be obvious that when the holding elements 42 are positioned in the slots and the cooperating grooves the holding elements will restrain any relative rotative movement between the pads and the fingers 12a.

In Figure 7 a slightly modified form of pad construction is shown and indicated as 58. This is identical to the first described construction except for the following points. The grooves 60 corresponding to the grooves 38, stop at the outer face of the rib 28. The inner end of the tongue portion 62 of a holding element 64, instead of being of a length to project into the rib 28 as in the first described construction is of a length, and is cut off square and is so shaped, as to complementarily engage the outer beveled edge of the rib 28. Thus, in this case, it is the coaction between the inner beveled edge and the portion 62 directly with the outer beveled edge 28 that serves to urge the axially outer edge of the pads radially outwardly, otherwise the two constructions are identical.

It will be clear from the foregoing description that the collet described and shown in the draw-

What is claimed is:

1. A collet device comprising, in combination, a master collet including a shell having a frusto-conical end portion and being axially slotted from said end portion to provide a plurality of integrally connected radial fingers circumferentially grooved internally at each finger and each finger being axially slotted from said end portion to provide a slot extending radially through said finger and a beveled bottom land sloping downwardly from the inner diameter to the outer diameter of said finger, each finger also having an axial groove interconnecting said circumferential groove and said slot, a separate gripping pad received by the inner face of each finger each pad having a circumferential outwardly-directed projection adapted to register in the circumferential groove of a respective finger and each pad having an axial groove adapted to mate the slot in said finger and said axial groove in said finger and provide a bottom land, a separate holding element received in each mating slot and axial grooves and seating in said bottom lands, and means to urge each holding element axially inwardly of said shell serving to radially urge each pad into contact with a corresponding finger.

2. A collet device comprising, in combination, a master collet including a shell having a frusto-conical end portion and being axially slotted from said end portion to provide a plurality of integrally connected radially flexible fingers and providing a dovetail circumferential groove internally at each finger and each finger being axially slotted from said end portion to provide a slot extending radially through said finger and a beveled bottom land sloping outwardly from the inner diameter to the outer diameter of said finger, each finger also having an axial groove interconnecting said circumferential groove and said slot, a separate gripping pad received by the radial inner face of each finger each pad having a circumferential outwardly-directed dovetail shoulder adapted to register in the circumferential groove of a respective finger and each pad having an axial groove adapted to mate the slot in said finger and said axial groove in said finger and provide a beveled bottom land sloping inwardly from the upper edge of the dovetail shoulder thereon to merge with the wall defining the bottom of the groove, and a separate holding element received in each mating slot and axial grooves and seating in said bottom lands to axially urge each pad axially inwardly of said shell and prevent rotative movement of said pads relative to said shell.

3. A collet device comprising, in combination, a master collet including a shell having a frusto-conical end portion and being axially slotted from said end portion to provide a plurality of integrally connected radially flexible fingers and providing a dovetail circumferential groove internally at each finger and each finger being axially slotted from said end portion to provide a slot extending radially through said finger and a beveled bottom land sloping downwardly from the inner diameter to the outer diameter of said finger, each finger also having an axial groove interconnecting said circumferential groove and said slot, a separate gripping pad received by the radial inner face of each finger each pad having a circumferential outwardly-directed dovetail shoulder adapted to register in the circumferential groove of a respective finger and each pad having an axial groove adapted to mate the slot of said finger and said axial groove in said finger and provide a beveled bottom land sloping inwardly from the upper edge of the dovetail shoulder thereon to meet the wall defining the bottom of the groove for forming a surface which is a portion of a frusto-conical surface, a separate holding element received in each mating slot and axial grooves and seating in said bottom lands, and separate means co-operating with each holding element between the axially outer end of each finger and each pad to axially urge each pad inwardly of said shell to bring the bottom surface of the shoulder on each pad into engagement with the bottom surface of the dovetail groove of the fingers and to rigidly position such holding elements in said grooves in said pads to prevent circumferential slipping of each pad in said shell.

4. A collet device comprising, in combination, a master collet including a shell having a frusto-conical end portion and being axially slotted from said end portion to provide a plurality of integrally connected radially flexible fingers circumferentially grooved internally at each finger and each finger being axially slotted from said end portion to provide a beveled bottom land sloping downwardly from the inner diameter to the outer diameter of said fingers, a separate gripping pad received by the radial inner face of each finger each pad having a circumferential outwardly-directed shoulder adapted to register within the circumferential groove of a corresponding finger and each pad having an axial groove adapted to mate the slot in said corresponding finger and provide a bottom land below the bottom land provided by said finger, and separate holding means having a tongue to seat in said bottom land of said groove and a body portion to seat in the bottom land of the corresponding finger to axially urge said pads inwardly of said shell and radially outwardly to contact a radial face of corresponding fingers and to prevent rotative movement of said pads relative to said shell.

EDGAR W. WILSON.

REFERENCES CITED

The following references are of record in the file of this patent:

UNITED STATES PATENTS

| Number | Name | Date |
|---|---|---|
| 2,228,337 | Balas | Jan. 14, 1941 |
| 2,275,343 | Bechert | Mar. 3, 1942 |
| 2,291,398 | Martin | July 28, 1942 |